No. 802,199. PATENTED OCT. 17, 1905.
J. B. CROSS.
MIXING MACHINE.
APPLICATION FILED JAN. 25, 1905.

WITNESSES:
H. C. Abbott
Wm. P. Patton

INVENTOR
Jay B. Cross
BY
ATTORNEYS

UNITED STATES PATENT OFFICE.

JAY B. CROSS, OF ONEONTA, NEW YORK.

MIXING-MACHINE.

No. 802,199.  Specification of Letters Patent.  Patented Oct. 17, 1905.

Application filed January 25, 1905. Serial No. 242,603.

*To all whom it may concern:*

Be it known that I, JAY B. CROSS, a citizen of the United States, and a resident of Oneonta, in the county of Otsego and State of New York, have invented a new and Improved Mixing-Machine, of which the following is a full, clear, and exact description.

This invention relates to mechanical means for mixing together the ingredients used in the production of bread, cakes, or pastry-dough, and has for its object to provide novel features of construction for a mixing-machine that are very simple and inexpensive, convenient to operate, readily taken apart for cleaning, and are strong and durable.

The invention consists in the novel construction and combination of parts, as is hereinafter described, and defined in the appended claims.

Reference is to be had to the accompanying drawings, forming a part of this specification, in which similar characters of reference indicate corresponding parts in all figures.

Figure 1:
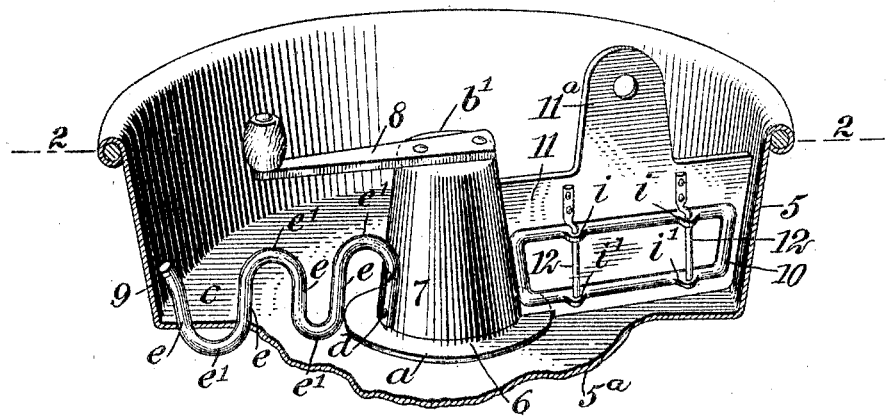
Figure 2:
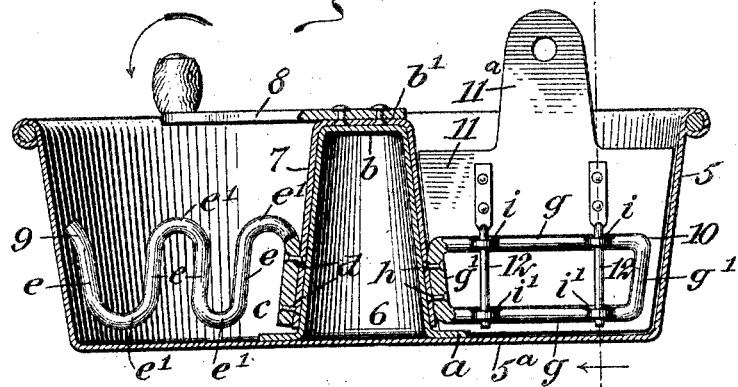
Figure 3:
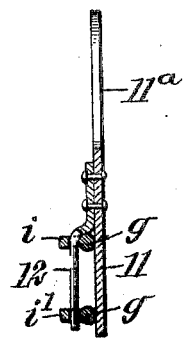

Figure 1 is a perspective view of the novel mixing device shown mounted upon a pan, broken away to expose the details of the improvement. Fig. 2 is a transverse sectional view taken substantially on the line 2 2 in Fig. 1, and Fig. 3 is a transverse sectional view substantially on the line 3 3 in Fig. 1.

While the features of improvement may be arranged for service in a receptacle having other shape than that shown and formed of different material, it is preferred to employ a sheet-metal pan 5 of proper dimensions, having a circular side wall and a flat bottom wall $5^a$ as a receiver in which materials are to be mixed.

Centrally in the pan 5 a coniform post 6 is secured upon the bottom wall $5^a$, said post having a flange $a$ radially projected from its lower end, which flange is seated upon the bottom of the pan and is affixed thereto by means of solder or by other available means. Preferably the hollow post 6 is closed at the upper end by a flat top plate $b$, which is integral with the side wall thereof, this construction of the post and its attachment upon the bottom $5^a$ of the pan affording strength to the post and greatly stiffening the bottom to resist strains that it incurs in service.

A hollow hub 7, conforming in shape with the coniform post 6, is fitted loosely thereon and has clearance at its lower end from the flange $a$, so that the hub may be rotated upon said post without wabbling, and to this end a handle-lever 8 is mounted upon and secured to the top wall $b'$ of the hub. The diameters of the post 6 and hub 7, together with their central position in the pan 5, afford an annular space between the hub 7 and the side wall of the pan 5, as is indicated at $c$.

Upon the side wall of the hub 7, near the lower end thereof, one end of a beater-arm 9 is affixed, as shown at $d$, said arm being preferably formed of a rod of metal bent into undulating form, thus providing a plurality of beater members $e$, that are held spaced apart by integral bends $e'$ at their ends, the lower bends being disposed near the pan-bottom $5^a$ and the free end of the beater-arm positioned near the side wall of said pan. Oppositely on the hub 7 another beater 10 is secured, this beater consisting of an oblong ring of metal or other suitable material. Preferably the beater 10 is formed of a wire rod bent at four points, so as to produce two parallel members $g$ $g$, that are spaced apart by the short end members $g'$ $g'$, and, as is clearly shown in Fig. 2, one of the end members $g'$ is affixed upon the hub 7 by rivets $h$. The end members $g'$ of the beater 10 diverge slightly from the lower side member $g$ thereof to the upper member $g$, the degree of divergence being such as will dispose the members $g$ parallel with the bottom wall $5^a$ of the pan when the hub 7 is mounted upon the post 6. Two ears $i$ $i$ are formed on the same side of the upper beater member $g$ and suitably spaced apart, these ears being located, respectively, above, like ears $i'$, that are formed on the lower beater member $g$, and each pair of vertically-alined ears $i$ $i'$ have central vertical perforations therein, as shown for one pair in Fig. 3.

A scraper 11, that may be formed of plate metal or be a wooden board, is an important detail of the invention and, as shown, is in the form of a flat planchet the ends of which are sloped so that they will respectively fit loosely against the inner surface of the side wall of the pan 5 and the inclined side wall of the hub 7, this contact being effected when the scraper is disposed transversely and upright within the annular space or chamber $c$ and has its lower straight edge loosely seated upon the bottom wall $5^a$ of the pan. Upon the upper edge of the scraper 11 a handle $11^a$ is formed, that affords a convenient grip-piece for manipulation of the scraper, as will be hereinafter described.

Two fingers 12 are secured by one end of each upon the same side of the scraper-blade 11 and are spaced apart parallel with each other a distance that permits them to respectively slide down through a vertically-alined pair of the ears *i i'*, and thus connect the scraper with the beater-arm 10, to be actuated thereby when the handle-lever 8 is rotated.

In operation the materials that are to be mixed into a plastic mass are placed together in the annular chamber *c* when the scraper 11 is removed from the beater-arm 10. The handle-lever 8 is now turned, thus causing the beaters 9 and 10 to traverse the mass of ingredients in the pan and thoroughly mix the same, the undulations on the arm 9 coacting with the quadrangular beater 10 to effect this result.

In mixing the ingredients, if liquid is a portion of the same, a coating of the mixed batter or the like will have a tendency to accumulate on the side wall and bottom wall of the pan. To remove this, the scraper-blade 11 is mounted upon the arm 10 by an engagement of the fingers 12 with the perforated ears *i i'*, as before explained, and the handle-lever 8 is turned in direction of the arrow in Fig. 2, said blade being held in contact with the walls of the pan.

It will be seen that the scraper 11 will completely remove the coating of mixed materials from the walls of the pan and stir the same through the mass of batter.

If the cake-batter is to be thickened by the admixture of flour therewith, the scraper-blade 11 is now removed and the flour added in proper quantity. The beaters 9 10 are now again rotated, which will thoroughly mix the batter and flour, forming a dough of proper consistency. Some of the plastic mass has collected upon the side and bottom walls of the pan by the mixing operation just described, and to remove it therefrom the scraper 11 is returned to position on the arm 10 and a single rotation is given to the same by manually turning the handle-lever 8. This will scrape the mixed dough from the walls of the pan, so that it may be readily removed, to effect which the beaters 9 10 and hub 7 are together removed from the pan by a lifting movement applied upon the handle-lever 8. The scraper-blade 11 may now be removed from the beater-arm 10 and used as a means for removing the sponge or dough from the pan, its form adapting it for very convenient service in that capacity. The scraper-blade 11 is also adapted for convenient service in molding the cake-dough into shape, if of a kind that requires subsequent kneading, and it will serve as a cutter to divide a mass of dough into loaves, if this is essential in the preparation of the same for baking.

It will be obvious that the improved mixing-machine may be employed for the blending together of other material than that hereinbefore specified—as, for example, it may be used to mix paint and blend colors of different shades together. It is also evident that the use of two mixing-arms is not imperative, as either one may be dispensed with, and the other will mix material; but for the highest efficiency the coacting beater-arms are preferably employed. It is also to be noted that the scraper-blade, while it adds to the effective service of the machine, is not indispensable, as it, together with the beater-arm 10, may be removed, and the other beater 9 will thoroughly mix ingredients into a blended mass, for which purpose its peculiar form renders it highly efficient.

Changes in the form and connection of parts may be made within the spirit and scope of the invention, and I claim all such changes as fall within the intent of the appended claims.

Having described my invention, I claim as new and desire to secure by Letters Patent—

1. The combination with a pan having a circular side wall and a flat bottom wall, a post centrally mounted in the pan on the bottom wall, and a hollow hub mounted rotatably on the post, of an undulating beater-arm extended radially from the hollow hub, an oblong ring-shaped arm projected from the hub opposite the undulating arm, a scraper-blade loosely fitted at its edges against the side wall and bottom of the pan, means for detachably mounting the scraper-blade on one side of the oblong ring-shaped arm, and means for rotating the hub and arms with the scraper-blade in position or when it is removed from its supporting-arm.

2. The combination with a receptacle, a post therein, a hollow hub mounted rotatably on the post, and means for rotating the hub, of an undulating beater-arm extended radially from the hub into the pan near its bottom, a quadrangular beater-arm having an oblong opening therein and extended from the hub opposite the undulating arm, perforated ears on the quadrangular arm, a scraper-blade shaped to scrape the sides and bottom of the receptacle, and fingers carried by said blade that may engage the perforated ears, for detachably connecting the scraper-blade with the quadrangular arm.

In testimony whereof I have signed this specification in the presence of two subscribing witnesses.

JAY B. CROSS.

Witnesses:
R. R. CROSS,
O. M. QUACKENBUSH.